US012812046B2

(12) United States Patent
Nguyen

(10) Patent No.: US 12,812,046 B2
(45) Date of Patent: Nov. 24, 2026

(54) IMAGE READING APPARATUS HAVING A RAIL FIXED COMMUNICATION LINE AND IMAGE FORMING APPARATUS INCLUDING SAME

(71) Applicant: KYOCERA Document Solutions Inc., Osaka (JP)

(72) Inventor: Anh The Nguyen, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 275 days.

(21) Appl. No.: 18/802,040

(22) Filed: Aug. 13, 2024

(65) Prior Publication Data

US 2025/0071217 A1 Feb. 27, 2025

(51) Int. Cl.

*H04N 1/00* (2006.01)
*H04N 1/10* (2006.01)
*H04N 1/23* (2006.01)

(52) U.S. Cl.

CPC ......... *H04N 1/00278* (2013.01); *H04N 1/103* (2013.01); *H04N 1/1039* (2013.01); *H04N 1/2315* (2013.01); *H04N 2201/0049* (2013.01)

(58) Field of Classification Search

None

See application file for complete search history.

(56) References Cited

U.S. PATENT DOCUMENTS

| | | | | |
|---|---|---|---|---|
| 5,001,768 A * | 3/1991 | Mita | H04N 1/401 | 708/277 |
| 2002/0171880 A1* | 11/2002 | Yui | H04N 1/03 | 358/505 |
| 2006/0001916 A1* | 1/2006 | Sheng | H04N 1/0083 | 358/474 |

FOREIGN PATENT DOCUMENTS

JP 2005070492 A 3/2005

* cited by examiner

*Primary Examiner* — Andrew H Lam

(74) *Attorney, Agent, or Firm* — IP Business Solutions, LLC.

(57) ABSTRACT

An image reading apparatus includes a document table, a reading device, a communication line, a rail, and a transport mechanism. On the document table, a document is placed. The reading device reads the document placed on the document table, and outputs image data. The communication line is configured to electrically transmit the image data. The rail extends along a reading direction in which the reading device reads the document placed on the document table, the communication line being fixed to the rail. The transport mechanism transports the reading device along the rail, thereby transporting the reading device along a reading route through which the reading device reads the document placed on the document table. The transport mechanism electrically connects the reading device to the communication line.

12 Claims, 10 Drawing Sheets

IMAGE READING APPARATUS HAVING A RAIL FIXED COMMUNICATION LINE AND IMAGE FORMING APPARATUS INCLUDING SAME

INCORPORATION BY REFERENCE

This application claims priority to Japanese Patent Application No. 2023-134614 filed on Aug. 22, 2023, the entire contents of which are incorporated by reference herein.

BACKGROUND

The present disclosure relates to an image reading apparatus and an image forming apparatus.

Image reading apparatuses that read the image of a document, typically exemplified by a scanner, are known. The image reading apparatus reads the image of the document, by causing a reading unit to reciprocate under the platen glass. Signals such as control signals to the reading unit are transmitted to required positions, according to the reciprocating movement of the reading unit, through a flat cable that deforms under the platen glass.

SUMMARY

The disclosure proposes further improvement of the foregoing techniques.

In an aspect, the disclosure provides an image reading apparatus including a document table, a reading device, a communication line, a rail, and a transport mechanism. On the document table, a document is placed. The reading device reads the document placed on the document table, and outputs image data. The communication line is configured to electrically transmit the image data. The rail extends along a reading direction in which the reading device reads the document placed on the document table, the communication line being fixed to the rail. The transport mechanism transports the reading device along the rail, thereby transporting the reading device along a reading route through which the reading device reads the document placed on the document table. The transport mechanism electrically connects the reading device to the communication line.

In another aspect, the disclosure provides an image forming apparatus including the foregoing image reading apparatus, and an image forming device. The image forming device forms an image on a recording medium, according to the image data electrically transmitted from the image reading apparatus.

DETAILED DESCRIPTION

Figure 1:
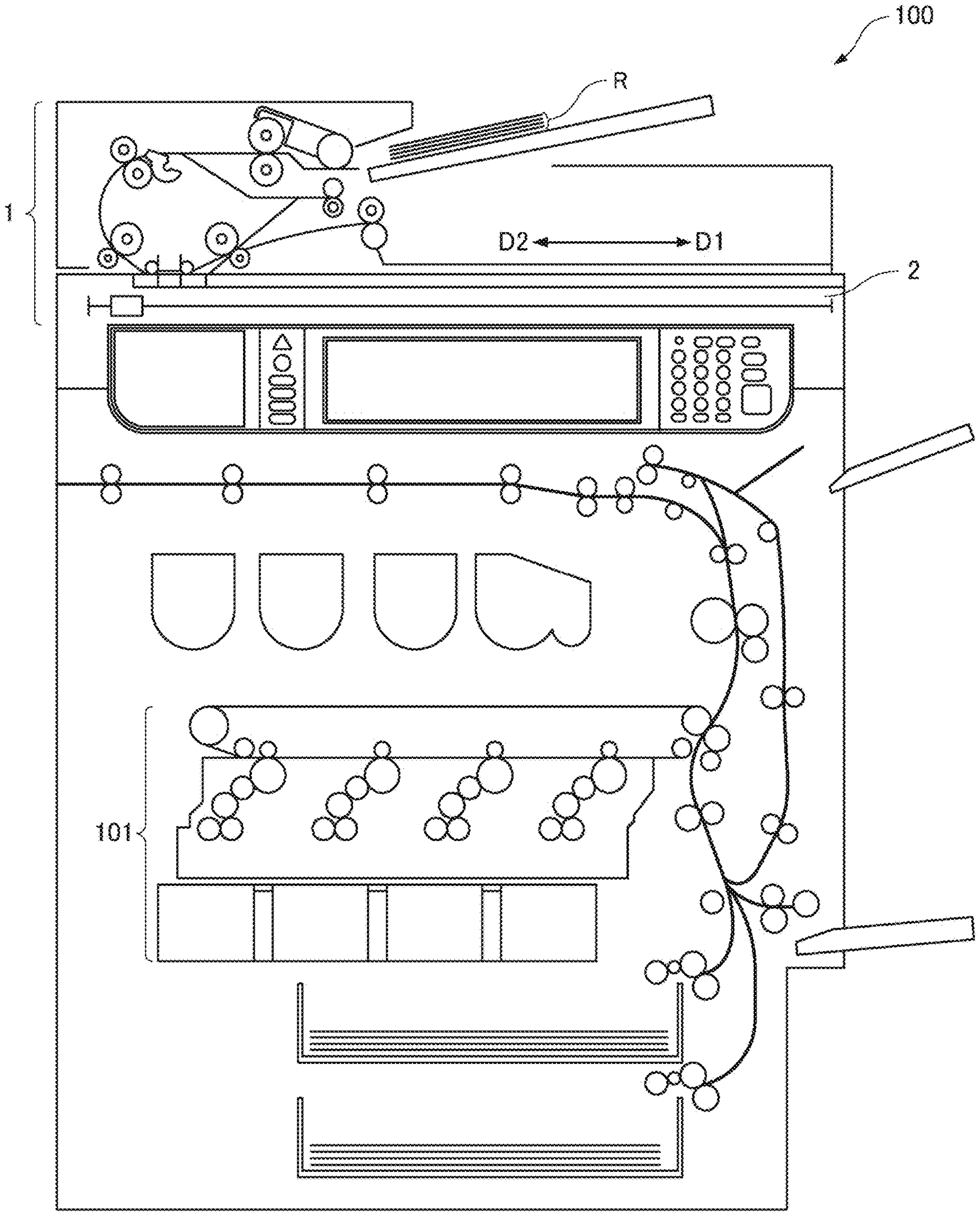
FIG. 1 is a schematic cross-sectional view showing an image forming apparatus according to an embodiment.

Hereafter, an image reading apparatus and an image forming apparatus according to an embodiment of the disclosure will be described, with reference to the drawings. In the drawings, the same or corresponding elements are given the same numeral, and the description of such elements will not be repeated.

Referring first to FIG. 1, an outline of the image forming apparatus 100 according to the embodiment will be described. FIG. 1 is a schematic cross-sectional view showing the image forming apparatus 100 according to the embodiment.

The image forming apparatus 100 is configured to form an image on a recording medium S, through an electrophotographic process or an ink jet process. Examples of the image forming apparatus 100 include a printer, a copier, and a multifunction peripheral (MFP). The image forming apparatus 100 shown in FIG. 1 is a printer that performs the electrophotographic process. The recording medium S may be, for example, a plain paper, a recycled paper, a thin paper, a thick paper, a coated paper, or an overhead projector (OHP) sheet.

As shown in FIG. 1, the image forming apparatus 100 includes an image reading apparatus 1 and an image forming device 101.

Figure 2:
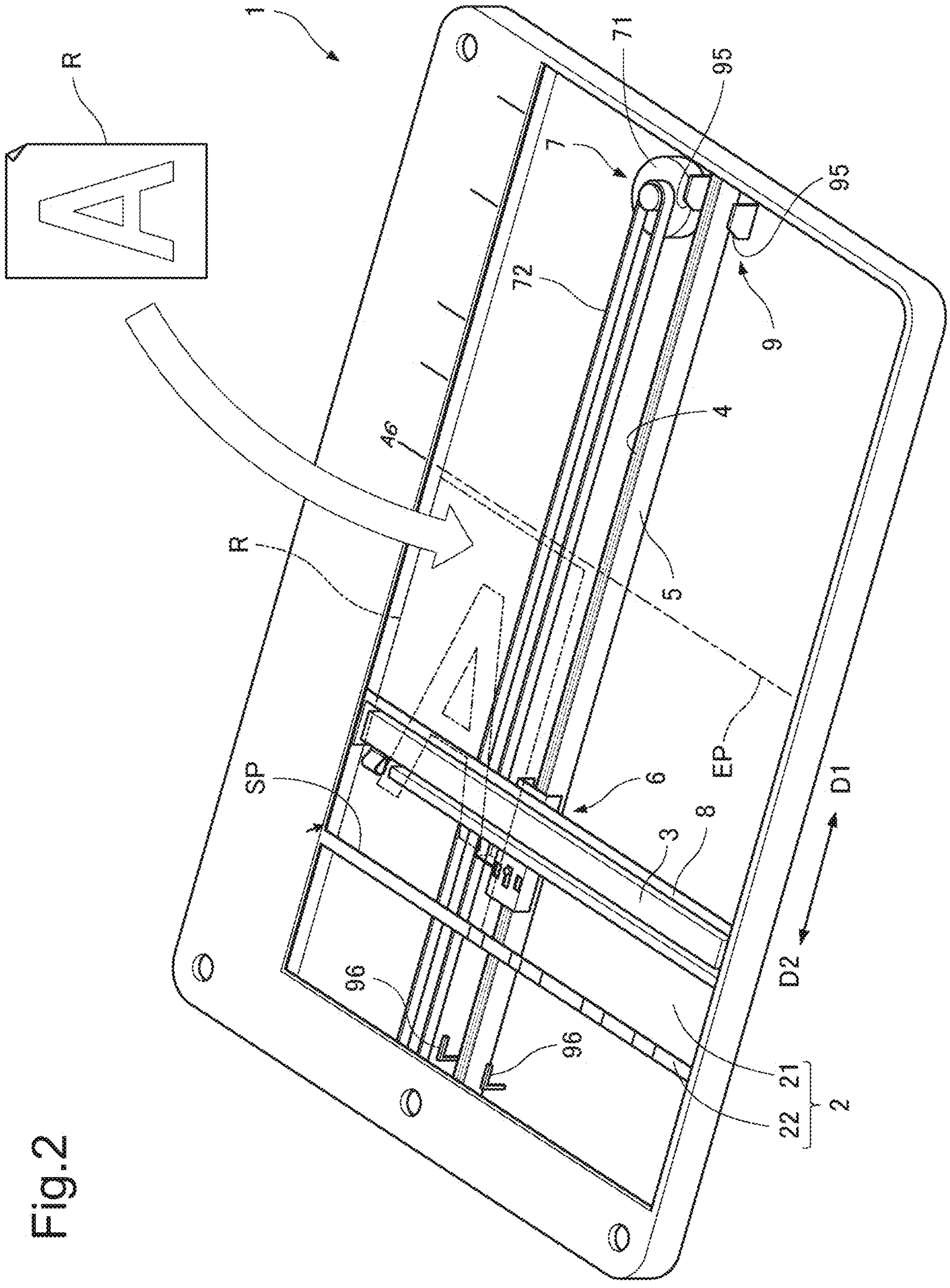
FIG. 2 is a perspective view showing an image reading apparatus included in FIG. 1.

An outline of the image reading apparatus 1 will be described, with reference to FIG. 2. FIG. 2 is a perspective view showing the image reading apparatus 1 included in FIG. 1.

As shown in FIG. 2, the image reading apparatus 1 reads the image on a document R, and outputs the corresponding image data. The document R may be formed of, for example, a plain paper, a recycled paper, a thin paper, a thick paper, a coated paper, or an OHP sheet. Alternatively, the document R may be a relatively thick material such as a book. Examples of the image include characters, a figure, a symbol, a color, or a combination of any two or more thereof.

The image reading apparatus 1 includes a document table 2, a reading device 3, a communication line 4, a rail 5, and a transport mechanism 6.

On the document table 2, the document R is placed. The document table 2 includes a light transmission member 21 and a document guide 22.

The light transmission member 21 is a light-transmissive plate material. Examples of the material of the light transmission member 21 include a plastic and glass. The document R is placed on the light transmission member 21.

The document guide 22 is a frame-shaped body provided on the light transmission member 21. The document guide 22 defines a stepped portion at the interface with the light transmission member 21. The position of the stepped portion serves as the reference position for placing the document R.

The user can set the document R at the reference position, by bringing the end portion of the document R into contact with the stepped portion of the document guide 22. Hereinafter, for convenience' sake, a direction toward the position on which the document R is placed, with respect to the document table 2, may be referred to as upward direction. The direction opposite to the upward direction may be referred to as downward direction.

The reading device 3 reads the document R placed on the document table 2, and outputs the corresponding image data. The reading device 3 is located on the lower side of the document table 2. The reading device 3 reads the image of the document R, on the basis of the light transmitted through the light transmission member 21. The reading device 3 may be, for example, a contact image sensor (CIS) having a light emitting diode (LED), an imaging lens, and an image sensor. The image data outputted from the reading device 3 can be electrically transmitted.

The reading device 3 reads an image in a prespecified range. Accordingly, the reading device 3 can read the entire image of the document R, by being transported in a predetermined direction, while reading the image on a part of the document R.

FIG. 2 indicates a start position SP where the reading device 3 starts to read the image, and an end position EP where the reading device 3 finishes reading the image, on the document table 2. The reading device 3 reads a portion of the document R located between the start position SP and the end position EP. In the document table 2 shown in FIG. 2, the start position SP is indicated by an arrow, while the end position EP differs depending on the size of the document R to be read. In FIG. 2, the end position EP for the document R of the A6 size is indicated, for the sake of convenience in description. Hereinafter, the direction in which the reading device 3 reads the document R placed on the document table 2 may be referred to as reading direction D1. The direction opposite to the reading direction D1 may be referred to as backward direction D2.

The communication line 4 includes a plurality of transmission lines 41 located on the surface, to electrically transmit the image data through each of the transmission lines 41. The communication line 4 may be, for example, a belt-like member on which the plurality of transmission lines 41, each formed of a metal wire, extend parallel to each other, on an insulative base material along the reading direction D1 (see FIG. 8 and FIG. 10). The destination to which the image data is transmitted through the communication line 4 is specified depending on the purpose. The communication line 4 may be, for example, connected to a non-illustrated controller of the image reading apparatus 1, or a non-illustrated antenna for transmitting the image data to outside of the image reading apparatus 1. The surface of each of the transmission lines 41 is electrically conductive. Therefore, the image data can be transmitted to the desired destination, by electrically connecting the reading device 3 to the surface of the transmission lines 41.

The rail 5, to which the communication line 4 is fixed, extends along the reading direction D1. The communication line 4 is fixed to the rail 5, at least over the travelling range of the transport mechanism 6, which will be subsequently described. The rail 5 is provided over the entire length of the document table 2, when viewed from above the document table 2. In addition, the rail 5 extends along the reading direction D1, to outside of the region between the start position SP and the end position EP, when viewed from above the document table 2.

The transport mechanism 6 transports the reading device 3 along the rail 5, thereby transporting the reading device 3 along the reading route through which the reading device 3 reads the document R placed on the document table 2. The reading route refers to the path through which the reading device 3 moves, to read the entire image of the document R. By being transported by the transport mechanism 6, the reading device 3 moves through the reading route, thereby reading the entire image of the document R. The rail 5 serves as the guide, for the transport mechanism 6 to transport the reading device 3.

In the transport mechanism 6, the reading device 3 is electrically connected to the communication line 4. Therefore, the image data outputted from the reading device 3 is transmitted to the communication line 4 fixed to the rail 5, via the transport mechanism 6. By thus providing the communication line 4, the flat cable that deforms under the platen glass can be excluded from the image reading apparatus 1, and therefore the risk of degradation in image forming quality can be minimized.

Referring further to FIG. 2, the outline of the transport mechanism 6 will be described hereunder.

The transport mechanism 6 includes a drive source 7, a connection mechanism 8, and a separation mechanism 9.

The drive source 7 is the motive power source for transporting the reading device 3 along the reading route. The drive source 7 includes a motor 71 and a belt 72. The motor 71 generates rotational force. The belt 72 has an annular shape. Though not shown, the inner surface of the belt 72 is formed with dips and bumps. The belt 72 can be made to revolve, because of the dips and bumps inside of the belt 72 being meshed with the rotary shaft of the motor 71. When the belt 72 revolves, the connection mechanism 8 moves in the reading direction D1, or in the backward direction D2.

The connection mechanism 8 is electrically connected to the reading device 3, and configured to make contact with the communication line 4. By making contact with the communication line 4, the connection mechanism 8 electrically connects the reading device 3 to the communication line 4. Further, the connection mechanism 8 transports the reading device 3 in the reading direction D1, or in the backward direction D2. Therefore, the image data outputted from the reading device 3 being transported is transmitted to the communication line 4, via the connection mechanism 8 in contact with the communication line 4.

The separation mechanism 9 moves the connection mechanism 8 away from the communication line 4, when the reading device 3 is transported in the backward direction D2. Accordingly, the time during which the connection mechanism 8 is in contact with the communication line 4 is reduced. As result, the risk of degradation of the connection mechanism 8, arising from the friction between the connection mechanism 8 and the communication line 4, can be reduced.

Figure 3:
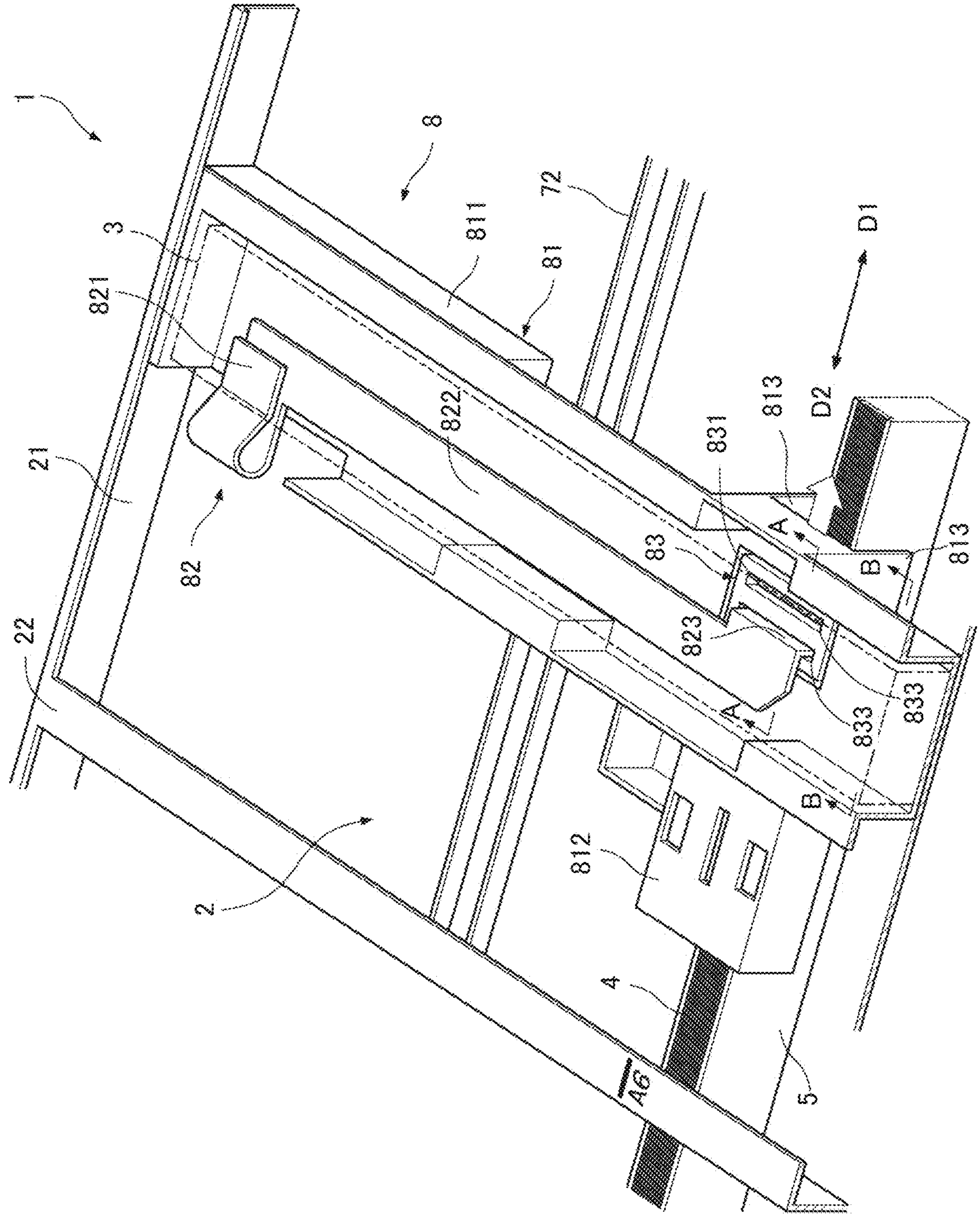
FIG. 3 is a perspective view showing a transport mechanism included in FIG. 2, with a reading device removed from the transport mechanism.
Figure 4:
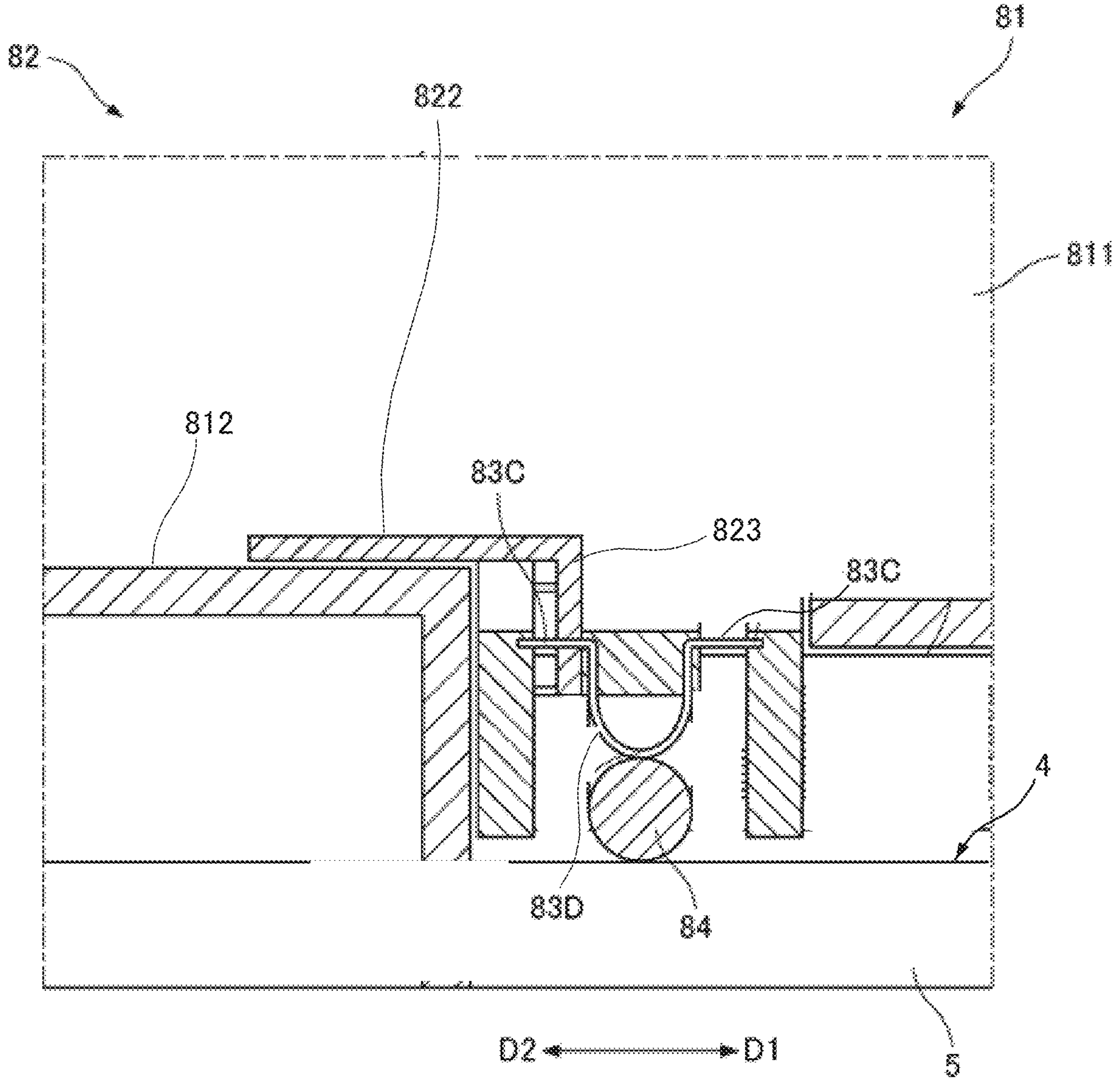
FIG. 4 is a cross-sectional view taken along a line A-A in FIG. 3.

Referring now to FIG. 3 and FIG. 4, the connection mechanism 8 will be described in further detail. FIG. 3 is a perspective view showing the transport mechanism 6 included in FIG. 2, with the reading device 3 removed from the transport mechanism 6. FIG. 4 is a cross-sectional view taken along a line A-A in FIG. 3.

As shown in FIG. 3, the connection mechanism 8 includes a carriage 81, a cable 82, a connector 8, and a roller 84 (see FIG. 4).

The carriage 81 transports the reading device 3 along the reading route. The carriage 81 includes a retention member 811 and a slider 812.

The retention member 811 is formed in a box shape, to accommodate therein the reading device 3. The shape of the retention member 811 may be determined as desired, depending on the type or shape of the reading device 3. The retention member 811 shown in FIG. 3 has a channel shape, open toward the document table 2. The retention member 811 shown in FIG. 3 extends in the direction orthogonally intersecting the reading direction D1, and such extending direction corresponds to the longitudinal direction of the retention member 811. The reading device 3 is accommodated in the gutter of the retention member 811. The retention member 811 shown in FIG. 3 includes a non-illustrated engaging portion, to be meshed with the dips and bumps on the inner surface of the belt 72. Accordingly, when the belt 72 revolves, the retention member 811 meshed therewith via the engaging portion is made to move in the reading direction D1, interlocked with the belt 72.

The slider 812 is located under the retention member 811, and placed on the rail 5. When the retention member 811 is made to move along the reading direction D1, interlocked with the revolution of the belt 72, the movement of the retention member 811 is guided by the rail 5, via the slider 812. Accordingly, the shape of the slider 812 may be determined as desired, depending on the shape of the rail 5. The slider 812 shown in FIG. 3 includes a pair of walls 813, 813, holding therebetween the rail 5 in the direction orthogonal to the reading direction D1. A gap is defined between the rail 5 and each of the walls 813.

The cable 82 is fixed to the carriage 81, and electrically connected to the reading device 3. The surface of the cable 82 is coated with an insulative film. An end portion of the cable 82 is connected to the reading device 3. The other end portion of the cable 82 is connected to the connector 83.

The connector 83 is electrically connected to the reading device 3, via the cable 82. The shape of the connector 83 may be determined as desired, depending on the shape of the cable 82.

The roller 84 shown in FIG. 4 is electrically connected to the connector 83. The connector 83 rotatably supports the roller 84, keeping the roller 84 in contact with the communication line 4, when the carriage 81 moves in the reading direction D1. To be more specific, the roller 84 includes a conductive relay member 841, formed in a ring shape on the circumferential surface, so as to make contact with the transmission lines 41. When the carriage 81 transports the reading device 3, the roller 84 rotates, with the relay member 841 kept in contact with the transmission lines 41. The roller 84 electrically connects the cable 82 to the communication line 4, via the connector 83. In addition, the roller 84 reduces the risk of wear of the communication line 4.

Figure 5:
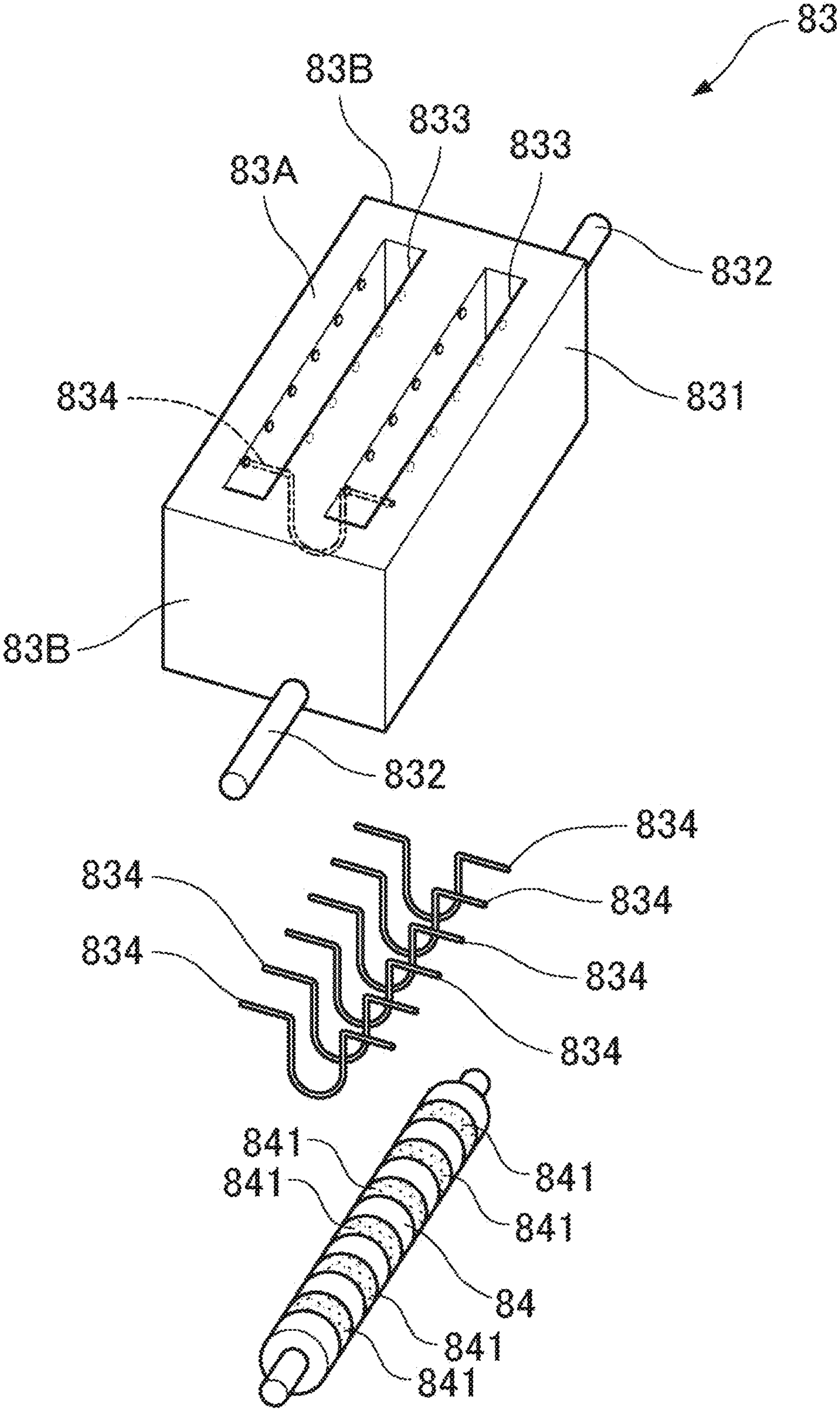
FIG. 5 is an exploded perspective view showing a connector included in FIG. 3.

Referring to FIG. 3 to FIG. 5, the structure of the cable 82 and the connector 83, and a preferable support structure of the connector 83 by the carriage 81, will be described hereunder. FIG. 5 is an exploded perspective view showing the connector 83 included in FIG. 3.

As shown in FIG. 3, the cable 82 includes a reading-side terminal 821, a cable main portion 822, and a connection terminal 823. Preferably, the cable 82 may be flexible. The cable 82 may be, for example, a flexible flat cable (FFC).

The reading-side terminal 821 corresponds to the end portion to which the reading device 3 is electrically connected. The shape of the reading-side terminal 821 may be determined as desired, depending on the type of the reading device 3.

The cable main portion 822 is for electrically transmitting the image data. The cable main portion 822 has a flat plate shape. The cable main portion 822 is retained by the retention member 811.

The connection terminal 823 can be deformed in the separation direction, in which the roller 84 shown in FIG. 4 is spaced from the communication line 4. The connection terminal 823 is connected to the connector 83. When the connector 83 moves in the separation direction, the connection terminal 823 is deformed in the separation direction.

As shown in FIG. 5, the connector 83 includes a case 831, projections 832, connection gates 833, and relay wires 834.

The case 831 rotatably supports the roller 84. The case 831 is supported by the carriage 81, so as to move in the separation direction. The roller 84 in contact with the communication line 4 can be kept from applying an excessive pressure to the communication line 4, because the connection terminal 823 is deformed in the separation direction, when the pressure against the communication line 4 is increased. Therefore, the risk of excessive friction, arising from the contact between the roller 84 and the communication line 4, can be reduced.

To be more specific, the case 831 includes a pair of sidewalls 83B, 83B, and an upper wall 83A. The sidewalls 83B each include a flat surface extending along the reading direction D1. The upper wall 83A is connecting the upper end portion of one of the sidewalls 83B and the upper end portion of the other sidewall 83B.

The projections 832 are each sticking out from the case 831. To be more specific, the projections 832 are sticking out to outside of the case 831, from the respective sidewalls 83B, 83B. The projections 832 are respectively supported by the pair of walls 813, 813 shown in FIG. 3, so as to move in the separation direction. For example, the pair of walls 813, 813 each include a through hole (not shown in FIG. 3). The through hole formed in the wall 813 has a space that allows the projection 832, inserted in the through hole, to move in the separation direction. With the pair of projections 832, 832 respectively inserted in the through hole of the pair of walls 813, 813, the case 831 is supported by the carriage 81, so as to move in the separation direction.

The connection gate 833 is an elongate slot formed so as to penetrate through the upper wall 83A, and extending in the direction orthogonal to the reading direction D1. A pair of connection gates 833 are formed in the upper wall 83A, with an interval therebetween in the reading direction D1. To the connection gate 833, the connection terminal 823 of the cable 82 is inserted.

The relay wire 834 electrically relays between the connection terminal 823 and the roller 84. The connector 83 includes a plurality of relay wires 834. Each of the relay wires 834 is electrically conductive. As shown in FIG. 4, each of the relay wires 834 is attached to the connection terminal 823 for connection, and in contact with the roller 84.

To be more specific, the relay wire 834 includes end portions 83C, 83C and a curved portion 83D, as shown in FIG. 4. The end portions 83C, 83C are located in the respective connection gates 833, along the reading direction D1. The connection terminal 823 inserted in the connection gate 833 is connected to the end portion 83C, which is attached to the connection terminal 823. Accordingly, the connection terminal 823 is electrically connected to the relay wire 834. The curved portion 83D is curved downward, between the end portions 83C, 83C. The roller 84 is fixed to the case 831, such that the relay member 841 makes contact with the bottom portion of the curved portion 83D. Since the relay wire 834 electrically relays between the connection terminal 823 and the relay member 841 of the roller 84, the connection terminal 823 can be kept from making direct contact with the relay member 841 of the roller 84, which is rotating, and therefore risk of the degradation of the cable 82 can be reduced.

Figure 6:
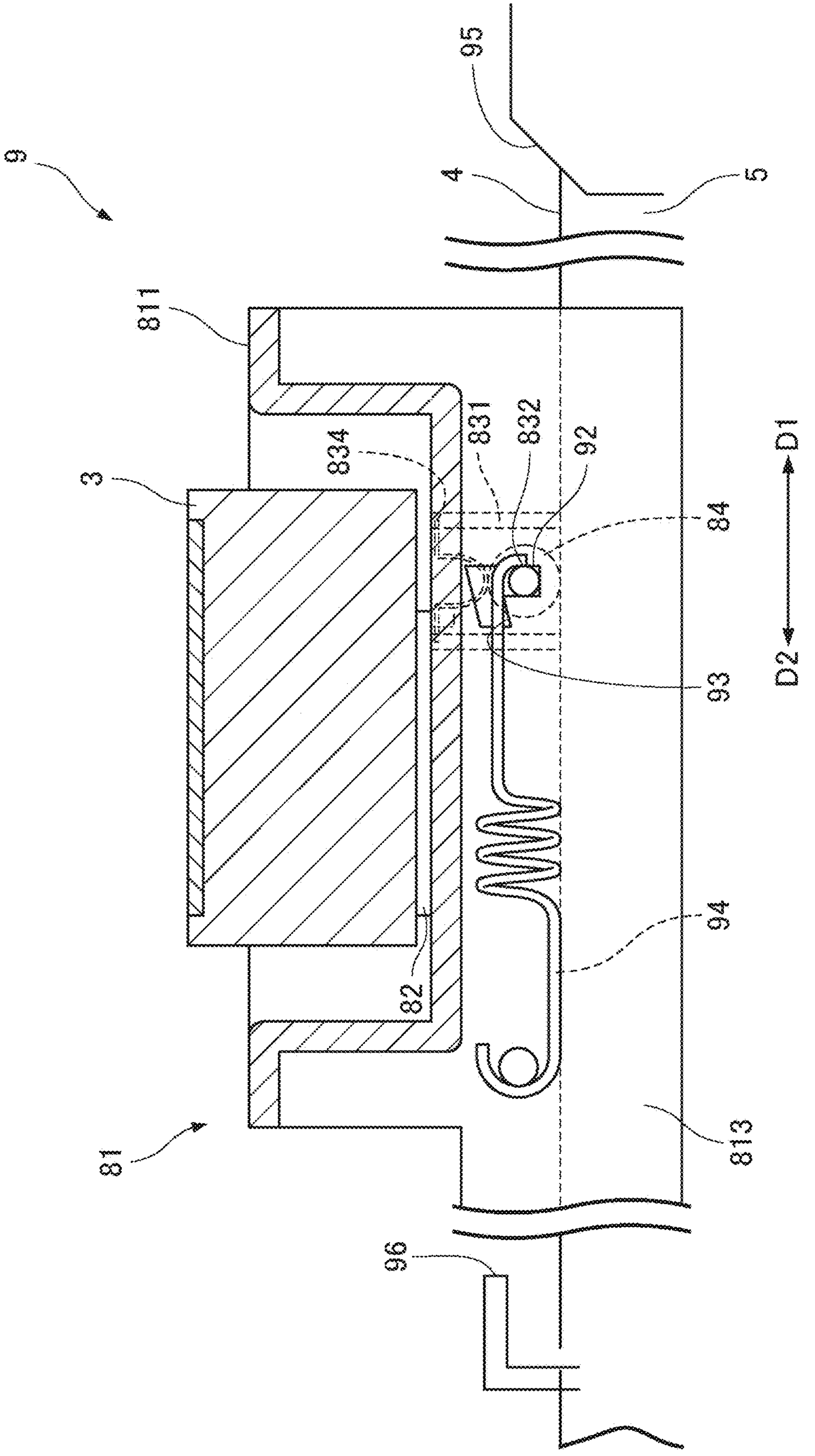
FIG. 6 is a cross-sectional view taken along a line B-B in FIG. 3, showing a separation mechanism.

The separation mechanism 9 will be described in further detail, with reference to FIG. 6. FIG. 6 is a cross-sectional view taken along a line B-B in FIG. 3, showing a separation mechanism 9.

As shown in FIG. 6, the separation mechanism 9 includes the projections 832, a first support portion 92, a second support portion 93, a pulling member 94, a first guide 95, and a second guide 96.

The first support portion 92 supports the projection 832, so as to locate the case 831 such that the roller 84 makes contact with the communication line 4. It suffices that the first support portion 92 is configured to support the projection 832, so as keep the roller 84 from separating from the communication line 4, when the carriage 81 is moving in the range between the start position SP and the end position EP.

The second support portion 93 supports the projection 832, so as to locate the case 831 such that the roller 84 is spaced from the communication line 4. It suffices that the second support portion 93 is configured to support the projection 832, so as keep the roller 84 from making contact with the communication line 4, when the carriage 81 is moving in the range between the start position SP and the end position EP.

With the first support portion 92 and the second support portion 93, the roller 84 moves between the position in contact with the communication line 4, and the position spaced therefrom.

Figure 7:
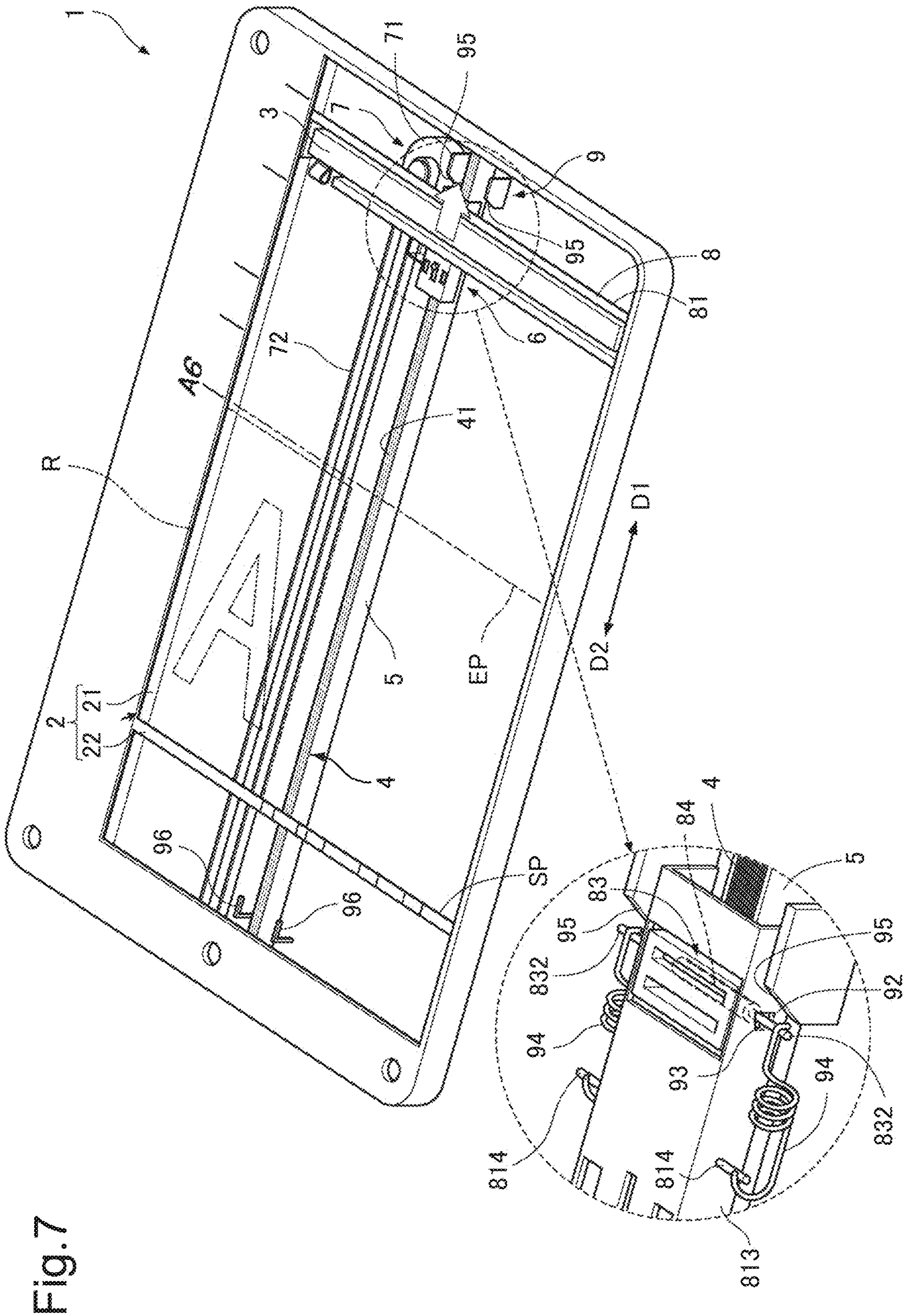
FIG. 7 is a perspective view showing a carriage included in FIG. 2 moving in a reading direction, including an enlarged view of a portion in the proximity of the connector.
Figure 8:
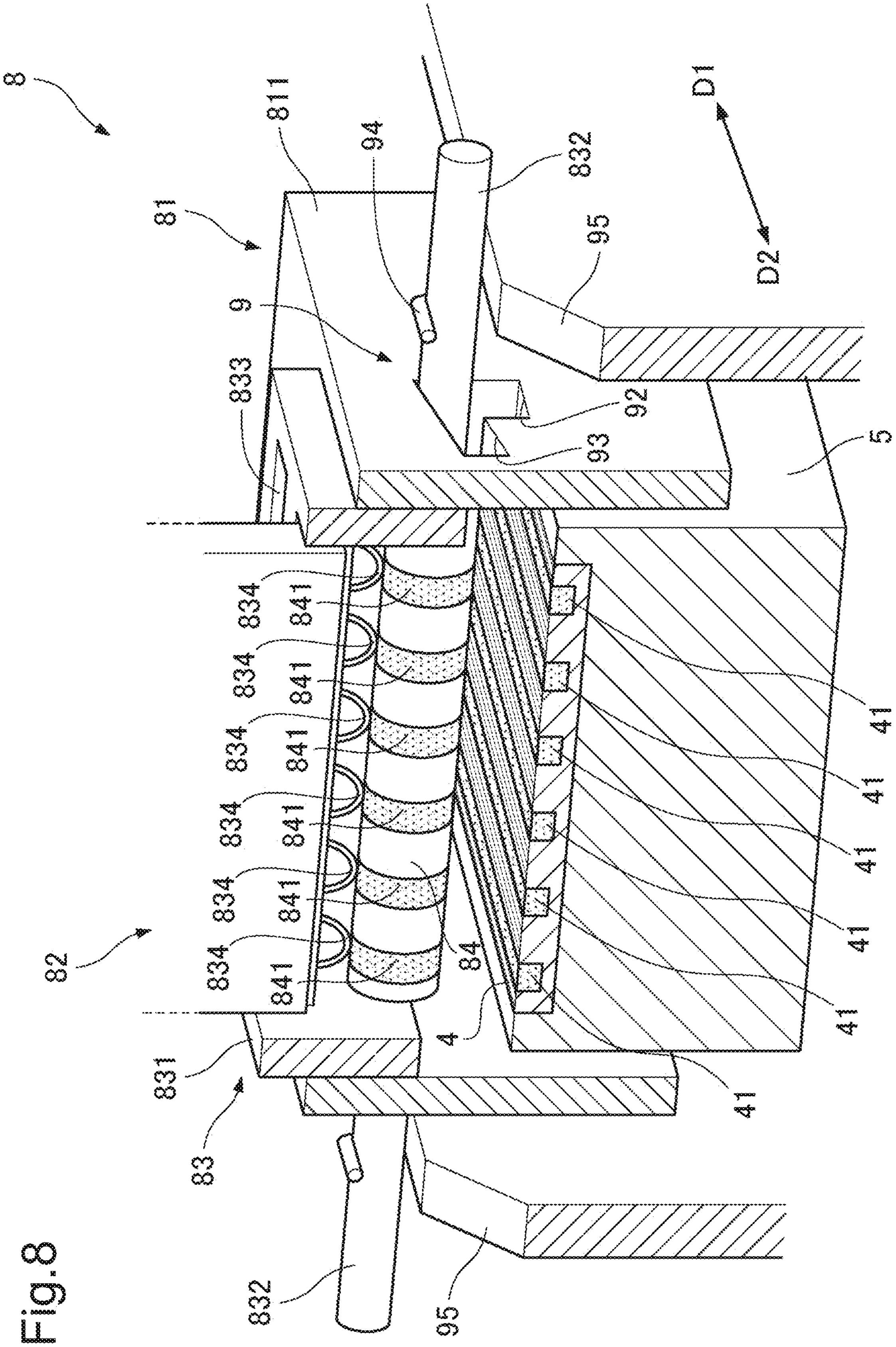
FIG. 8 is a partially cut-away perspective view showing a portion in the proximity of the connector, in which a first guide is guiding a projection.
Figure 9:
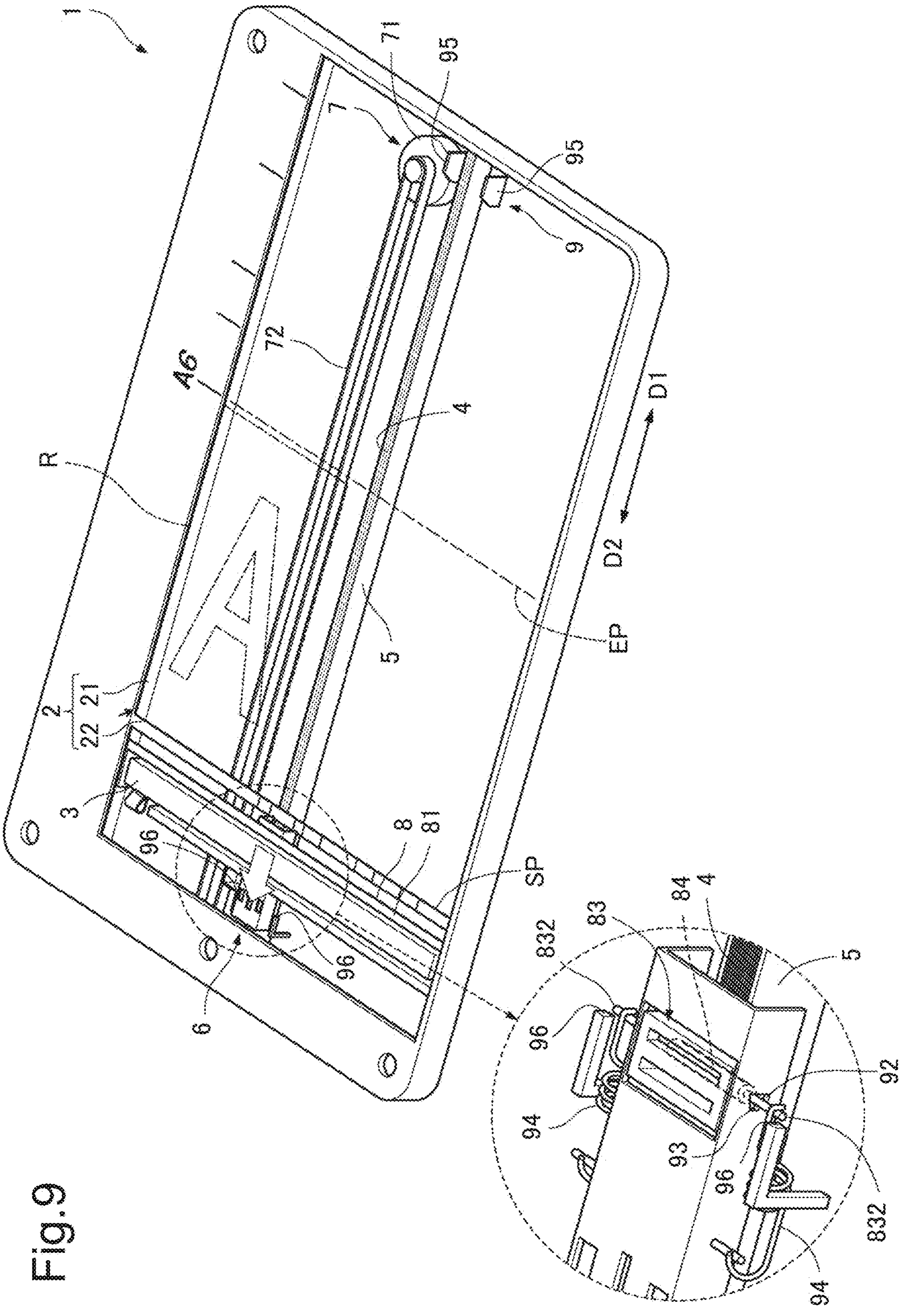
FIG. 9 is a perspective view showing the carriage included in FIG. 7 moving in a backward direction, including an enlarged view of the portion in the proximity of the connector.
Figure 10:
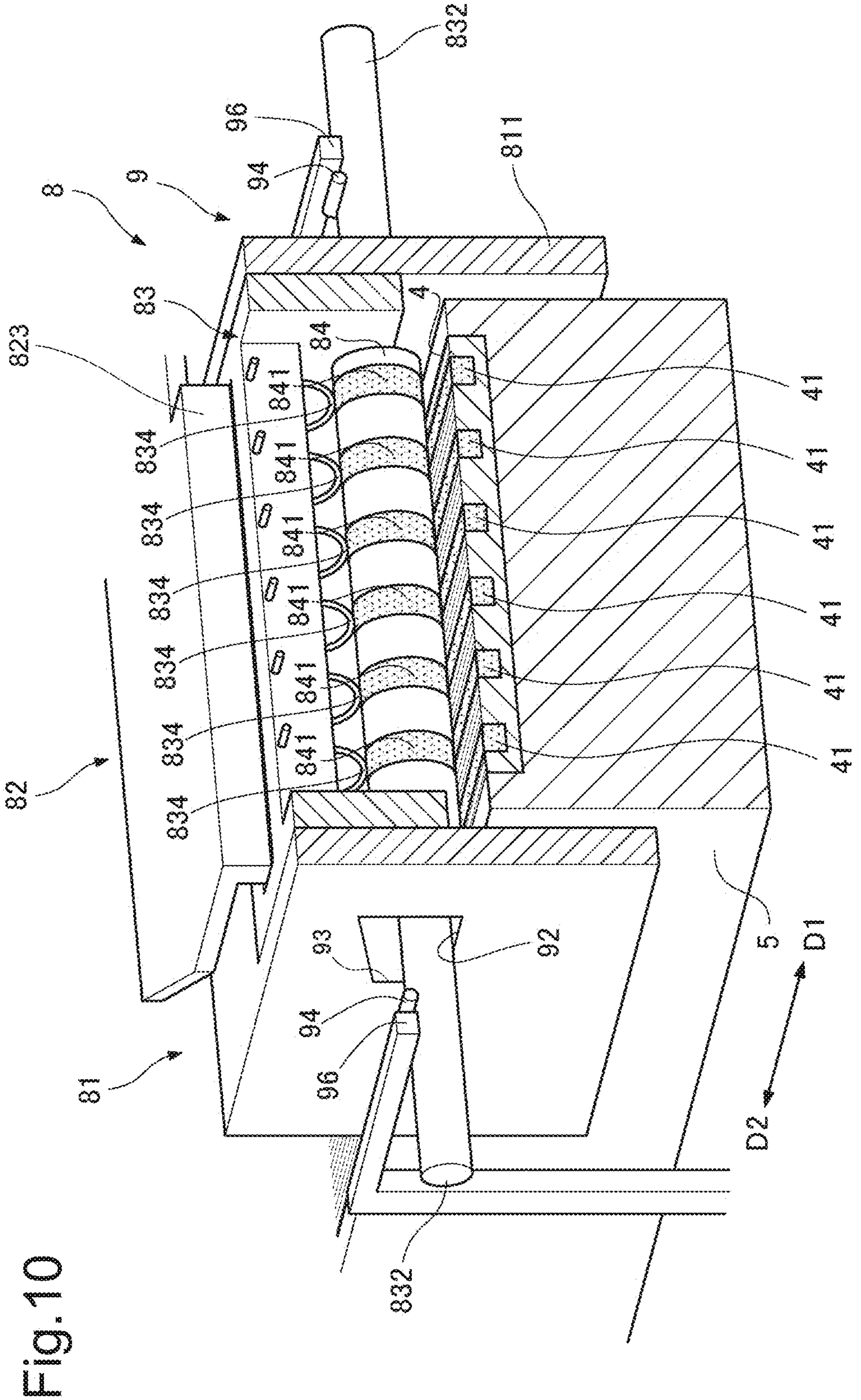
FIG. 10 is a partially cut-away perspective view showing the portion in the proximity of the connector, in which a second guide is guiding the projection.

Referring to FIG. 6 to FIG. 10, a preferable structure of the projection 832, the first support portion 92, and the second support portion 93 will be described hereunder. FIG. 7 is a perspective view showing the carriage 81 included in FIG. 2 moving in the reading direction D1, including an enlarged view of a portion in the proximity of the connector 83. In the enlarged view of the proximity of the connector 83, included in FIG. 7, the retention member 811 is omitted for the sake of convenience in description. FIG. 8 is a partially cut-away perspective view showing a portion in the proximity of the connector 83, in which the first guide 95 is guiding the projection 832. FIG. 9 is a perspective view showing the carriage 81 included in FIG. 7 moving in the backward direction D2, including an enlarged view of the portion in the proximity of the connector 83. In the enlarged view of the proximity of the connector 83, included in FIG. 9, the retention member 811 is omitted for the sake of convenience in description. FIG. 10 is a partially cut-away perspective view showing the portion in the proximity of the connector 83, in which the second guide 96 is guiding the projection 832.

The projection 832 is sticking out toward the carriage 81, as shown in FIG. 6 and FIG. 7. The first support portion 92 is provided on the carriage 81. In addition, the first support portion 92 is recessed in the direction to bring the roller 84 (see FIG. 6) into contact with the communication line 4. The second support portion 93 is provided on the carriage 81. In addition, the second support portion 93 is continuous from the first support portion 92, and recessed in the backward direction D2. Therefore, the structure that allows the roller 84 to move between the position in contact with the communication line 4 and the position spaced therefrom, can be concentrated into the carriage 81 and the case 831. As result, the separation mechanism 9 can be formed in a smaller size.

To be more specific, the first support portion 92 and the second support portion 93 are provided on each of the pair of walls 813, 813 of the slider 812. In addition, the first support portion 92 and the second support portion 93 are penetrating through the wall 813. The projection 832 is sticking out from the first support portion 92 and the second support portion 93, to the space outside of the wall 813.

The pulling member 94 pulls the in the backward direction D2. The pulling member 94 may be, for example, a coil spring. The slider 812 further includes a hook portion 814, to retain the pulling member 94. The hook portion 814 is sticking out from the wall 813, to the opposite side of the rail 5. An end portion of the pulling member 94 is engaged with the hook portion 814. The other end portion of the pulling member 94 is engaged with the projection 832 sticking out to the space outside of the wall 813. The natural length of the pulling member 94 is set to a value shorter than the distance between the projection 832 and the hook portion 814, defined when the projection 832 is located at the second support portion 93. Accordingly, the pulling member 94 can pull the projection 832 in the backward direction D2.

The first guide 95 serves to guide the projection 832 supported by the first support portion 92 toward the second support portion 93, when the carriage 81 moves in the reading direction D1. The first guide 95 is located ahead of the position where the reading device 3 finishes reading the document R, in the reading direction D1.

As shown in FIG. 7, the projection 832 is guided to the first guide 95, when the carriage 81 transports the reading device 3 in the reading direction D1. Accordingly, after the reading device 3 has finished reading the image, the roller 84 is located at the position spaced from the communication line 4. Therefore, the roller 84 can be prevented from making contact with the communication line 4, when the reading device 3 is transported in the backward direction D2.

To be more specific, the first guide 95 is formed as a sloped surface inclined upward in the reading direction D1. The sloped surface is small in size, and simple in structure. Therefore, the first guide 95 can be located in a small space.

As shown in FIG. 7, when the carriage 81 moves in the reading direction D1, the projection 832 is guided by the first guide 95, so as to be lifted up to the space where the first support portion 92 and the second support portion 93 are continuous with each other. Accordingly, the roller 84 is spaced from the communication line 4, as shown in FIG. 8. Since the pulling member 94 pulls the projection 832 in the backward direction D2, the projection 832 is made to move toward the second support portion 93, and then supported by the second support portion 93.

As shown in FIG. 9, the second guide 96 serves to guide the projection 832 supported by the second support portion 93, toward the first support portion 92, when the carriage 81 moves in the backward direction D2. The second guide 96 is located ahead of the position where the reading device 3 starts to read the document R, in the backward direction D2.

To be more specific, the projection 832 is guided to the second guide 96, when the carriage 81 transports the reading device 3 in the backward direction D2. Accordingly, the roller 84 is brought into contact with the communication line 4, before the reading device 3 starts to read the image. Therefore, when the reading device 3 is transported in the reading direction D1, the reading device 3 is electrically connected to the communication line 4. As result, when the reading device 3 is transported in the reading direction D1, the image data outputted from the reading device 3 is transmitted to the appropriate destination.

The second guide 96 is a bar-shaped member sticking out in the reading direction D1. The second guide 96 shown in FIG. 9 is supported by a pillar. The bar-shaped second guide 96 is small in size and simple in structure. Accordingly, the second guide 96 can be provided in a small space. In addition, the second guide 96 is located so as to make contact with the upper portion of the projection 832, supported by the second support portion 93.

As shown in FIG. 9, when the carriage 81 moves in the backward direction D2, the projection 832 is guided by the distal end portion of the second guide 96, so as to be squeezed into the space where the first support portion 92 and the second support portion 93 are continuous with each other. The projection 832 thus squeezed into the space where the first support portion 92 and the second support portion 93 are continuous with each other, is guided by the lower portion of the second guide 96, so as to move toward the first support portion 92. Accordingly, the roller 84 makes contact with the communication line 4, as shown in FIG. 10. Since the pulling member 94 is pulling the projection 832 in the backward direction D2, the projection 832 is blocked by the second support portion 93. Thus, the pulling member 94 serves to keep the projection 832 blocked by the second support portion 93, in other words keep the roller 84 in contact with the communication line 4.

As described above, the first guide 95 and the second guide 96 each serve to locate the roller 84 at the appropriate position, simply with the movement of the carriage 81 in the reading direction D1, or in the backward direction D2. The first guide 95 locates the roller 84, simply with the movement of the carriage 81 in the reading direction D1, at the position spaced from the communication line 4, before the carriage 81 starts to move in the backward direction D2. Therefore, the carriage 81 can move in the backward direction D2, with the roller 84 spaced from the communication line 4. Likewise, the second guide 96 brings the roller 84, simply with the movement of the carriage 81 in the backward direction D2, into contact with the communication line 4, before the carriage 81 starts to move in the reading direction D1. Therefore, the carriage 81 can move in the reading direction D1, with the roller 84 kept in contact with the communication line 4. As result, the wear of the communication line 4 due to the friction with the roller 84 can be suppressed.

As shown in FIG. 1, the image forming device 101 forms the image on the recording medium S, on the basis of the image data electrically transmitted from the image reading apparatus 1. Here, the image reading apparatus 1 is configured to reduce the risk of degradation in image reading quality. Therefore, the image forming apparatus 100 can form the image based on the image data, acquired with stabilized reading quality, on the recording medium S.

The aforementioned existing image reading apparatus includes the flat cable that deforms under the platen glass according to the reciprocating movement of the reading unit, to transmit signals such as the control signal to the reading unit. However, the flat cable that deforms under the platen glass is accompanied with various risks that may degrade the image reading quality. For example, the flat cable may make contact with the platen glass, thereby producing minute scratches on the platen glass. Although some image reading apparatuses are configured to reduce the risk of the degradation in image reading quality, for example by improving the flat cable so as to keep the flat cable from contacting the platen glass, it is desirable to further reduce the risk of the degradation in image reading quality.

The configuration according to the foregoing embodiment eliminates the drawback in that the flat cable makes contact with the platen glass thereby producing minute scratches on the platen glass, and thus further reduces the risk of the degradation in image reading quality.

The embodiment of the disclosure has been described as above, with reference to the drawings. However, the disclosure is not limited to the foregoing embodiment, but may be modified in various manners, without departing from the scope of the disclosure. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

INDUSTRIAL APPLICABILITY

The disclosure provides the image reading apparatus and the image forming apparatus, and is therefore industrially applicable.

What is claimed is:

1. An image reading apparatus comprising:
a document table on which a document is placed;
a reading device that reads the document placed on the document table, and outputs image data;
a communication line configured to electrically transmit the image data;
a rail extending along a reading direction in which the reading device reads the document placed on the document table, the communication line being fixed to the rail;
a transport mechanism that transports the reading device along the rail, thereby transporting the reading device along a reading route through which the reading device reads the document placed on the document table,
wherein the transport mechanism electrically connects the reading device to the communication line,
wherein the transport mechanism includes a connection mechanism electrically connected to the reading device, and configured to make contact with the communication line, d
wherein the connection mechanism electrically connects the reading device to the communication line, by making contact with the communication line,
wherein the connection mechanism includes:
a carriage that transports the reading device along the reading route;
a cable fixed to the carriage, and electrically connected to the reading device;
a connector electrically connected to the reading device via the cable; and
a roller supported by the connector, and including a conductive relay member electrically connected to the connector, and
wherein the roller rotates in contact with the communication line, when the carriage transports the reading device.

2. The image reading apparatus according to claim 1,
Wherein, when the carriage transports the reading device, the connector supports the roller such that the roller rolls along the communication line, with the relay member formed on a circumferential surface of the roller kept in contact with a conductive transmission line provided on the communication line.

3. The image reading apparatus according to claim 1, wherein the cable includes a connection terminal deformable in a separation direction in which the roller moves away from the communication line, and connected to the connector, the connector includes a case that rotatably supports the roller, and the case is supported by the carriage so as to move in the separation direction.

4. The image reading apparatus according to claim 3, wherein the connector further includes a plurality of relay wires electrically relaying between the connection terminal and the relay member of the roller, and each of the relay wires is electrically conductive, connected to the connection terminal, and in contact with the relay member of the roller.

5. The image reading apparatus according to claim 3, wherein the transport mechanism further includes a separation mechanism that moves the connection mechanism away from the communication line, when the reading device is transported in a backward direction opposite to the reading direction.

6. The image reading apparatus according to claim 5, wherein the separation mechanism includes:

a projection sticking out from the case;

a first support portion that supports the projection so as to locate the case such that the relay member of the roller makes contact with the communication line; and a second support portion that supports the projection so as to locate the case such that the relay member of the roller is spaced from the communication line.

7. The image reading apparatus according to claim 6, wherein the projection is sticking out toward the carriage, the first support portion is formed in the carriage, and recessed in a direction to bring the roller into contact with the communication line, and the second support portion is formed in the carriage as a continuous portion from the first support portion, and recessed in the backward direction.

8. The image reading apparatus according to claim 7, wherein the separation mechanism further includes:

a pulling member that pulls the projection in the backward direction;

a first guide that guides the projection supported by the first support portion toward the second support portion, when the carriage moves in the reading direction; and a second guide that guides the projection supported by the second support portion toward the first support portion, when the carriage moves in the backward direction.

9. The image reading apparatus according to claim 8, wherein the first guide is located ahead of a position where the reading device finishes reading the document, in the reading direction, the second guide is located ahead of a position where the reading device starts to read the document, in the backward direction, and the projection is guided to the first guide when the carriage transports the reading device in the reading direction, and guided to the second guide when the carriage transports the reading device in the backward direction.

10. The image reading apparatus according to claim 9, wherein the first guide includes a sloped surface inclined upward in the reading direction.

11. The image reading apparatus according to claim 9, wherein the second guide is sticking out in the reading direction, in a bar shape.

12. An image forming apparatus comprising:

the image reading apparatus according to claim 1, and an image forming device that forms an image on a recording medium, according to the image data electrically transmitted from the image reading apparatus.

* * * * *